United States Patent
Ott

(10) Patent No.: US 11,975,788 B2
(45) Date of Patent: May 7, 2024

(54) MOTORCYCLE WITH A MULTIFUNCTIONAL DEVICE

(71) Applicant: KTM AG, Mattighofen (AT)

(72) Inventor: Andreas Ott, Schechen (DE)

(73) Assignee: KTM AG, Mattighofen (AT)

(*) Notice: Subject to any disclaimer, the term of this patent is extended or adjusted under 35 U.S.C. 154(b) by 721 days.

(21) Appl. No.: 17/127,046

(22) Filed: Dec. 18, 2020

(65) Prior Publication Data
US 2021/0188389 A1    Jun. 24, 2021

(30) Foreign Application Priority Data

Dec. 19, 2019 (AT) .............................. A 51131/2019

(51) Int. Cl.
*B62J 50/22* (2020.01)
*B60K 35/00* (2024.01)
(Continued)

(52) U.S. Cl.
CPC .............. *B62K 11/14* (2013.01); *B60K 35/00* (2013.01); *B62J 50/22* (2020.02); *B62J 50/28* (2020.02); *G07C 5/008* (2013.01); *H04W 4/40* (2018.02); *H04W 4/80* (2018.02); *B60K 35/22* (2024.01); *B60K 35/28* (2024.01); *B60K 35/80* (2024.01); *B60K 35/81* (2024.01);
(Continued)

(58) Field of Classification Search
CPC . B62K 11/14; H04W 4/80; H04W 4/10; B62J 50/22; B62J 50/28; B60K 2370/47; B60K 2370/152; B60K 2370/166; B60K 2370/52; B60K 2370/573
See application file for complete search history.

(56) References Cited

U.S. PATENT DOCUMENTS 6,249,744 B1    6/2001   Morita
8,725,410 B2    5/2014   Ando et al.
(Continued)

FOREIGN PATENT DOCUMENTS

DE    10338354    3/2005
DE    60035649    11/2007
(Continued)

*Primary Examiner* — Jacob D Knutson
(74) *Attorney, Agent, or Firm* — WENDEROTH, LIND & PONACK, L.L.P.

(57) ABSTRACT

A motorcycle includes a display unit for representing information on the driving state and operating parameters of the motorcycle, an operating unit to generate control commands for controlling the display unit, and a multifunctional device with a screen. An application can be installed on the multifunctional device to allow other applications installed on the multifunctional device to be opened. The selection of further applications to be opened by the application can be represented on the screen in the form of pictograms. A control unit uses control commands for controlling the application, and the further applications to be opened by the application can be transmitted to the multifunctional device. The control commands for controlling the application, and the further applications to be opened by the application, can be generated by the operating unit, and a switching device can switch between control of the display unit and control of the multifunctional device.

25 Claims, 4 Drawing Sheets

(51) Int. Cl.
  *B62J 50/28*   (2020.01)
  *B62K 11/14*   (2006.01)
  *G07C 5/00*    (2006.01)
  *H04W 4/40*    (2018.01)
  *H04W 4/80*    (2018.01)
  *B60K 35/22*   (2024.01)
  *B60K 35/28*   (2024.01)
  *B60K 35/80*   (2024.01)
  *B60K 35/81*   (2024.01)

(52) U.S. Cl.
  CPC .... *B60K 2360/166* (2024.01); *B60K 2360/47* (2024.01); *B60K 2360/573* (2024.01)

(56) References Cited

U.S. PATENT DOCUMENTS

| | | | |
|---|---|---|---|
| D716,702 S | 11/2014 | Song et al. | |
| D722,538 S | 2/2015 | Song et al. | |
| 9,096,162 B2 | 8/2015 | Kikuchi et al. | |
| 9,216,789 B2 | 12/2015 | Hamlin et al. | |
| 9,381,803 B2 | 7/2016 | Galsworthy et al. | |
| 9,394,859 B2 | 7/2016 | Parnofiello et al. | |
| 9,421,860 B2 | 8/2016 | Schuhmacher et al. | |
| 9,457,866 B2 | 10/2016 | Osanai et al. | |
| 9,550,541 B2 | 1/2017 | Lenton et al. | |
| 9,771,122 B1 | 9/2017 | Felicilda | |
| 9,908,577 B2 | 3/2018 | Novak et al. | |
| 9,941,079 B2 | 4/2018 | Osanai et al. | |
| 9,958,111 B2 | 5/2018 | Oltmans | |
| 10,183,717 B2 | 1/2019 | Holt et al. | |
| 10,189,524 B2 | 1/2019 | Schafer et al. | |
| 10,549,804 B2 | 2/2020 | Zellmer et al. | |
| 10,609,745 B2 | 3/2020 | Tsai et al. | |
| 10,760,730 B2 | 9/2020 | Lenton et al. | |
| 10,810,810 B2 | 10/2020 | Matsuda et al. | |
| 2010/0082249 A1 | 4/2010 | Ando et al. | |
| 2013/0234845 A1 | 9/2013 | Kikuchi et al. | |
| 2014/0131128 A1 | 5/2014 | Schuhmacher et al. | |
| 2014/0131129 A1 | 5/2014 | Galsworthy et al. | |
| 2014/0136076 A1 | 5/2014 | Novak et al. | |
| 2015/0129342 A1 | 5/2015 | O'Rourke et al. | |
| 2015/0130209 A1 | 5/2015 | Hamlin et al. | |
| 2015/0274247 A1 | 10/2015 | Osanai et al. | |
| 2015/0353156 A1 | 12/2015 | Hamlin et al. | |
| 2016/0280324 A1 | 9/2016 | Schafer et al. | |
| 2016/0293360 A1 | 10/2016 | Osanai et al. | |
| 2016/0298807 A1 | 10/2016 | Oltmans | |
| 2016/0318569 A1 | 11/2016 | Zellmer et al. | |
| 2017/0101149 A1 | 4/2017 | Lenton et al. | |
| 2017/0274958 A1 | 9/2017 | Felicilda | |
| 2018/0162474 A1 | 6/2018 | Novak et al. | |
| 2018/0216780 A1 | 8/2018 | Oltmans | |
| 2018/0255592 A1 | 9/2018 | Tsai et al. | |
| 2019/0180525 A1 | 6/2019 | Matsuda et al. | |
| 2019/0210683 A1 | 7/2019 | Lin | |
| 2020/0355318 A1 | 11/2020 | Parnofiello et al. | |

FOREIGN PATENT DOCUMENTS

| | | | | |
|---|---|---|---|---|
| DE | 102013200179 | | 9/2013 | |
| DE | 102013200179 A1 | * | 9/2013 | ............. B60K 37/02 |
| DE | 102015203958 | | 10/2015 | |
| DE | 102016202729 | | 10/2016 | |
| DE | 102016203194 | | 8/2017 | |
| DE | 102017201089 | | 9/2017 | |
| EP | 3 373 624 | | 9/2018 | |
| EP | 3495169 | | 6/2019 | |
| JP | 2001-071966 | | 3/2001 | |
| JP | 2013-184547 | | 9/2013 | |
| JP | 2014097798 A | * | 5/2014 | ......... B60R 11/0241 |
| JP | 5826314 B2 | * | 12/2015 | ......... B60R 11/0241 |
| JP | 2017-171277 | | 9/2017 | |
| JP | 2018-069796 | | 5/2018 | |
| JP | 2018-144794 | | 9/2018 | |
| JP | 2018144794 A | * | 9/2018 | ............. B60K 35/00 |
| KR | 101355374 B1 | * | 1/2014 | ............. F16M 11/04 |
| KR | 20170099308 A | * | 8/2017 | ............. B62J 99/00 |
| KR | 20180064090 A | * | 6/2018 | ............. H04W 4/10 |
| TW | M549732 | | 10/2017 | |
| WO | WO-2014083024 A2 | * | 6/2014 | ............. B62J 11/00 |
| WO | 2018/041999 | | 3/2018 | |

\* cited by examiner

MOTORCYCLE WITH A MULTIFUNCTIONAL DEVICE

BACKGROUND OF THE INVENTION

The invention relates to a set comprising a motorcycle including a display unit for representing information on the driving state and on operating parameters of the motorcycle, an operating unit, which may generate control commands for controlling the display unit, a multifunctional device, releasably attachable in a holder, comprising a screen, wherein an application can be installed on the multifunctional device, using which further applications installed on the multifunctional device can be opened, wherein the selection of further applications, which can be opened by the application, can be represented on the screen in the form of pictograms, and a control unit, using which control commands for controlling the application and the further applications, which can be opened by the application, can be transmitted to the multifunctional device.

DE 10 2016 203 194 discloses a motorcycle with an operating unit for influencing motorcycle functions, in particular a display function. In that, an additional operating unit is provided, arranged to issue radio control commands, in particular to influence radio device functions. A control device is coupled with the operating unit and the additional operating unit via a data link. The control device is arranged for controlling motorcycle functions and for receiving radio control commands issued by the additional operating unit, on the basis of which a radio device, as for example a mobile phone, can be controlled via a sending device provided in the control device. This operating unit has the disadvantage that the additional operating unit is arranged at the handlebar, causing a distraction from the operation of the motorcycle. This represents a substantial safety risk.

DE 10 2016 202 729 discloses a grip switch for a motorcycle, comprising a composite switch, which is exclusively suitable for operating, e.g., a navigation device integrated in the cockpit of the motorcycle, while being aligned with other switches. Thus, the navigation device can be operated by the rider via the composite switch, while the rider is in the riding position and capable of controlling other functions of the motorcycle via the existing switches. The composite switch as well as the other switches are arranged in the housing of the grip switch. The navigation device can be replaced by a smartphone or a similar mobile electronic device. With this grip switch, too, the disadvantage is associated, that the composite switch represents an additional operating unit at the handlebar, the operation of which causes distraction, which in particular with motorcycles represents a considerable safety risk.

In an increasing number of motorcycles, a holder for a smartphone is installed, which is used for different functions during motorcycle tours. Mostly, these are older motorcycles or motorcycles, the displays of which do not yet offer connectivity features, such as, e.g., navigation functions or music functions, via a link to a navigation device or a smartphone, resp. In that, holders are quite often subsequently attached to the motorcycle. Particularly appreciated in that is the advantage of navigation via a smartphone, which is taken along for any motorcycle tour anyway. Operation of a smartphone attached this way, however, is extremely cumbersome and practically impossible while driving, especially since neither the keys nor the touchscreen of the smartphone can be operated while wearing motorcycle gloves.

In the state of the art, it is also known to additionally arrange a navigation device in the cockpit of motorcycles next to a display unit, on which essential information about the motorcycle state, such as, for example, speed or velocity, are represented, wherein the navigation device is connected with the display unit via a data line. In that, an operating unit can be provided, using which the display unit as well as the navigation device can be controlled, wherein there is a selection via a switching device, whether the display unit or the navigation device is controlled. Since this is a proprietary system, there is no scope for creativity for the user. In addition, such systems have the disadvantage that the necessary data lines require additional effort and must already be pre-assembled upon assembly of the motorcycle. Thus, on the whole, it is an inflexible solution, wherein, in addition, subsequent installation normally is not possible.

SUMMARY OF THE INVENTION

Therefore, it is an objective of the present invention to avoid the above disadvantages and to provide a set with a motorcycle and a multifunctional device, in which, on the one hand, the possibility to control the multifunctional device is provided, without the rider being distracted from operating the motorcycle. Furthermore, with regard to the functions of the multifunctional device to be selected, high flexibility is to be provided.

The motorcycle according to the invention comprises a display unit, using which information on the driving state and on operating parameters of the motorcycle are represented. Usually, this is a display unit with a LCD or OLED display known per se in the state of the art, for example a so-called TFT display (thin-film transistor display). Perceivable, however, are also other types of display units, such as with an at least partially analogous display. Represented on the display unit is information such as the current driving speed, the speed of the engine, the kilometre reading of the motorcycle, the air temperature, but also safety-relevant information, for example related to critical system conditions of the motorcycle (mostly in the form of warning or indicator lights).

The display unit is controlled with an operating unit, wherein control commands for controlling the display unit can be generated. Thus, for example, using switches included in the operating unit, which information is represented can be selected. It is also possible for the operator to undertake various settings at the motorcycle, for example concerning the set-up of the motorcycle, wherein the various possible settings are represented by the display unit and selected via the operating unit. In any case, e.g., upon actuating a switch of the operating unit, control commands for controlling the display unit are generated.

Furthermore, the set according to the invention includes a multifunctional device with a screen, which is releasably attachable in a holder. In that, the holder is arranged in the area of the cockpit, and preferably in the proximity of the display unit, so that the rider can keep an eye on the display unit as well as the screen of the multifunctional device. On the multifunctional device, an application can be installed, using which further applications installed on the multifunctional device can be opened. These further applications can be represented on the screen in the form of pictograms.

Using a control unit, control commands for controlling the application can be transmitted to the multifunctional device. In particular, these control commands can serve selecting to open the application chosen by the rider, and subsequently controlling this application.

In a preferred embodiment of the invention, the multifunctional device is designed as a smartphone. The applications usually installed on a smartphone are way too numerous to be operated while riding a motorcycle. In addition, the vast majority of these applications have no relevance for a motorcycle ride. Therefore, the application provided according to the invention can first serve displaying a selection of applications relevant for a motorcycle ride on the screen of the smartphone. Subsequently, the application according to the invention is used to select one of the further applications and to control it via control commands of the control unit.

In general, the further applications, which can be opened with the application according to the invention, can be, for example, an application with a music function, an application with a navigation function, an application with a telephone function, an application with a messaging function, an application for operating a camera, an application for displaying or audio playback of weather information, an application for displaying or audio playback of news and the like.

According to the invention, the control commands for controlling the application and the further applications, which can be opened by the application, can be generated by the operating unit. In other words, the operating unit, using which the display unit is controlled, is also used for controlling the multifunctional device via the application installed thereon. In order to select, whether the display unit or the multifunctional device is controlled, a switching device for switching between controlling of the display unit and controlling of the multifunctional device is provided.

For that, a computer program is provided which monitors the switching device and, upon actuation of the switching device, switches from that operating mode, in which control commands for the display unit are generated by actuating the operating unit, to that operating mode, in which control commands for the multifunctional device are generated by actuating the operating unit, and vice versa.

The operating unit includes actuating elements, preferably in the form of rotary, push, or toggle switches. The operating unit is controlled using these actuating elements, for example, for selecting the information to be represented or the concrete type of representation of the display unit, or for undertaking settings at the motorcycle on the basis of a selection represented by the display unit. The actuating elements can also be used for controlling the multifunctional device, once the switching device has been actuated. Thereby, it is possible to control the multifunctional device without overly distracting the rider. With the installable application and the further applications, high flexibility is provided. In particular, further applications, which can be opened, can be subsequently added or the existing applications extended.

While the display unit mostly does not obtain an update of its operating software over the entire lifecycle of the motorcycle, with a multifunctional device, in particular in the form of a smartphone, updates of the operating software and the installed applications can be installed at regular intervals. In addition, releasably attachable multifunctional devices can be renewed even after a shorter period, whereby the hardware of the multifunctional device, too, is kept up to date.

Which operating mode is currently active is displayed by the display unit and/or on the screen of the multifunctional device. In other words, whether the operating unit is currently set for controlling the display unit or for controlling the multifunctional device can be displayed. It can, however, also be specified to provide a separate warning light at the operating unit for this purpose.

Thus, via the common operating unit, which, for example, comprises commercially available switches for controlling the display unit, control commands can be send to the display unit as well as to the multifunctional device. No additional operating units at the handlebar are necessary. Beside actuating elements for controlling the display unit and controlling the multifunctional device, the operating unit itself can include further actuating elements, for example, to actuate the direction indicators or a horn.

The application according to the invention on the multifunctional device is the interface between the motorcycle, its rider, and the multifunctional device. Using this application, the functions of the multifunctional device can be operated. Thus, the application, using which the further installed applications can be opened, serves as an interface application.

In a preferred embodiment of the invention, the operating unit is designed as a grip switch at the handlebar of the motorcycle. With a grip switch, the actuating elements can be actuated using the thumb or other fingers, without having to take the hand off the handlebar. Thus, via the applications, which can be opened, those functions used particularly often can be operated without any risk while driving.

Independent of the operation of the multifunctional device via the application according to the invention, the screen of the multifunctional device can be provided as a touchscreen and thus allow more complicated operating steps via the touchscreen while standing. For example, these may be general settings of the applications, such as, e.g., view settings or settings with regard to voice output. In addition, for an application with a navigation function, it can be specified to pre-define navigation targets via the touchscreen of the multifunctional device, for example for a longer motorcycle tour. For an application with a telephone function, contacts can be pre-defined via the touchscreen. For an application with a messaging function, messages or text blocks can be pre-defined. For an application with a music function (music player), playlists can be compiled.

The operating unit can comprise actuating elements in the form of arrow keys and/or in the form of a multi-way switch, preferably a four-, five-, or six-way switch.

The switching device can be a separate actuating element, preferably in the form of a switch, on the operating unit. It is, however, also possible that a special actuation of an actuating element with further functions actuates the switching device. This, e.g., can be long pressing of the actuating element.

In a preferred embodiment, the motorcycle has a sending unit, using which the control commands for controlling the application as well as the control commands for controlling the further applications, which can be opened by the application, can be wirelessly transmitted to the multifunctional device. In that, the sending unit can be designed for sending radio commands, in particular according to the Bluetooth® standard. For example, the Bluetooth® Classic Standard HID profile is used for the transmission.

Wireless transmission provides for particularly high flexibility, especially since no fixedly predetermined wirelines are required in or at the motorcycle. Upon using standardized radio commands, for example according to the very widespread Bluetooth® standard, most different multifunctional devices can be coupled to the motorcycle, independent of which type of plug the multifunctional device has for connecting with a wireline. The sending unit itself can be directly integrated in the operating unit. It can, however, also be possible to arrange the sending unit in the display unit. In this case, the control commands for the multifunctional device generated by the operating unit are transmitted to the sending unit via a wireline.

Alternatively, it is also possible to provide a special communications unit, which is connected with the operating unit and/or with the display unit via an electrical line, in particular via a bus line. In that, the sending unit for transmitting the control commands can be arranged in this communications unit.

The sending unit can also be arranged between the operating unit and the display unit. In this case, the sending unit intercepts control commands of the operating unit and, depending on the operating mode, either passes them on to the display unit or to the multifunctional device. The sending unit acts as an interface enabling wireless communication to the multifunctional device. The sending unit can, for example, comprise a microcontroller with a Bluetooth® module, which are embedded on a circuit board in the form of a so-called embedded system. For this arrangement, the sending unit is wired with the operating unit and the display unit.

In a further embodiment of the invention, the control unit and/or the sending unit can transmit information on the driving state and/or on operating parameters of the motorcycle to the multifunctional device, preferably in a wireless manner. In this case, the application according to the invention or one of the further applications, which can be opened by the application according to the invention, is designed to graphically represent this information on the driving state and/or on the operating parameters. In that, it can be selected using the operating unit, which information is represented on the screen of the multifunctional device. The screen of the multifunctional device acts as an additional screen to the display unit. This has the advantage that more information can be displayed for the motorcyclist.

Preferably, at least one of the further applications, which can be opened by the application, has a navigation function. While the display unit displays information on the operating state of the motorcycle, in this case, the screen of the multifunctional device represents information on the driving state dependent on the current location. The navigation function can have the common functionality of navigation devices known per se in the state of the art, in particular turn-by-turn navigation. Upon controlling with the operating unit, however, it can be provided to only offer reduced functionality, for example, such that only pre-defined navigation targets can be selected.

The multifunctional device has a receiving unit for wirelessly transmittable control commands, using which these control commands can be received. These can be, for example, so-called Bluetooth® listeners. The control commands received are then transmitted to or read out by the application according to the invention and/or the further applications, which can be opened by the application according to the invention.

In addition, or alternatively thereto, the multifunctional device can have a receiving device, which is designed to receive control commands generated and transmitted by an external device. The receiving device can be the receiving unit, which receives the control commands transmitted by the sending unit. It can, however, also be a separate device. With the receiving device, it is possible to control the multifunctional device using an external device. For example, this can be a headset, preferably installed in the helmet. This includes a device which generates control commands for the multifunctional device from voice commands and sends them to the multifunctional device. For example, via the voice input at the headset, a contact saved on the multifunctional device can be searched, and optionally also a call can be started. A further example is the selection of a navigation target via voice input. Possible examples of voice commands are, e.g., "Open map" or "Navigate to . . . ". The application can also be controlled using voice input. In that, the receiving device can be activated only after actuation of an actuating element of the operating unit or only during actuation of an actuating element of the operating unit.

In a further embodiment of the invention, the multifunctional device includes a sending device, using which control commands can be wirelessly transmitted to one or several external devices. In that, the control commands are generated by the application according to the invention and the further applications, which can be opened by the application according to the invention. The wirelessly transmittable control commands can be radio commands, preferably according to the Bluetooth® standard. The external devices can be, for example, a camera, a smartwatch and/or a headset. In that, the camera, the smartwatch, or the headset can be activated using the control commands. Generation of the control commands can be activated by an input at the operating unit, using which the applications installed on the multifunctional device are controlled. For controlling the external device, at least one of the further applications, which can be opened by the application, has a control function for the external device.

The sending device, however, can also be designed to transmit data to an external device. Thus, for example, music stored on the multifunctional device or received from the multifunctional device can be transmitted to a headset.

The sending device can also be designed to return data to the motorcycle, e.g., to a communications unit installed in the motorcycle. This data can then, for example, be displayed on the display unit. In addition, or alternatively thereto, the sending device, however, can also be designed to transmit control commands to the motorcycle. In that, these control commands can be generated by one of the further applications, which can be opened by the application. Thus, for example, in case of rain being forecast, an application with a weather function can alter various settings of the motorcycle, such as, e.g., set the ABS more sensitive or regulate the engine down upon reaching a certain speed. The sending device can also be designed to pass on control commands received by the receiving device, which were generated and transmitted by an external device, to the motorcycle control. For example, voice commands "Indicator left" or "High beam on" can be input via a headset and passed on to the motorcycle control via the sending device. This then executes these commands, so that, e.g., the direction indicator to the left is activated or the high beam is switched on.

In a further embodiment, the holder includes a device for charging the multifunctional device. This can be an inductive or a cable-bound charging device. The charging device can be connected with the battery of the motorcycle. Thus, it is possible to charge the multifunctional device while driving, so that it can still be used after the ride.

In order to enable the above functionality, the invention furthermore relates to a computer program product for operating a motorcycle. The computer program product comprises commands, which upon execution of the program by a computer cause the same to operate the operating unit of the motorcycle in two operating modes, wherein, in one operating mode, upon actuation of the operating unit, control commands for controlling a display unit for representing information on the driving state and on operating parameters of the motorcycle are generated, while in the other operating mode, upon actuation of the operating unit, control commands for controlling an application installed on a multifunctional device as well as further applications installed on the multifunctional device, which can be opened by the application, are generated and transmitted to the multifunctional device, preferably in a wireless manner, and monitor a switching device for actuation and switch the operating mode upon actuation of the switching device.

The invention furthermore relates to a data carrier signal transferring such a computer program product, a computer-readable data carrier, on which such a computer program product is stored, and a motorcycle with a computer-readable data carrier, on which such a computer program product is stored. By means of a charging device, it is avoided that the multifunctional device is no longer available during the ride due to consumption of the battery.

In order to enable the above functionality, the invention furthermore relates to a computer program product for operating a multifunctional device as described above. The computer program product comprises commands, which, upon execution of the program by a multifunctional device, cause the same to accept control commands generated by the operating unit of a motorcycle as described above and to open and control applications installed on the multifunctional device. This computer program product is the application, using which further applications installed on the multifunctional device can be opened and/or controlled.

The invention furthermore relates to a data carrier signal transferring such a computer program product, a computer-readable data carrier, on which such a computer program product is stored, and a multifunctional device with a computer-readable data carrier, on which such a computer program product is stored.

BRIEF DESCRIPTION OF THE DRAWINGS

In the following, further details and advantages of the present invention are explained in more detail based on the description with reference to the drawings, in which.

DETAILED DESCRIPTION OF THE INVENTION

Figure 1:
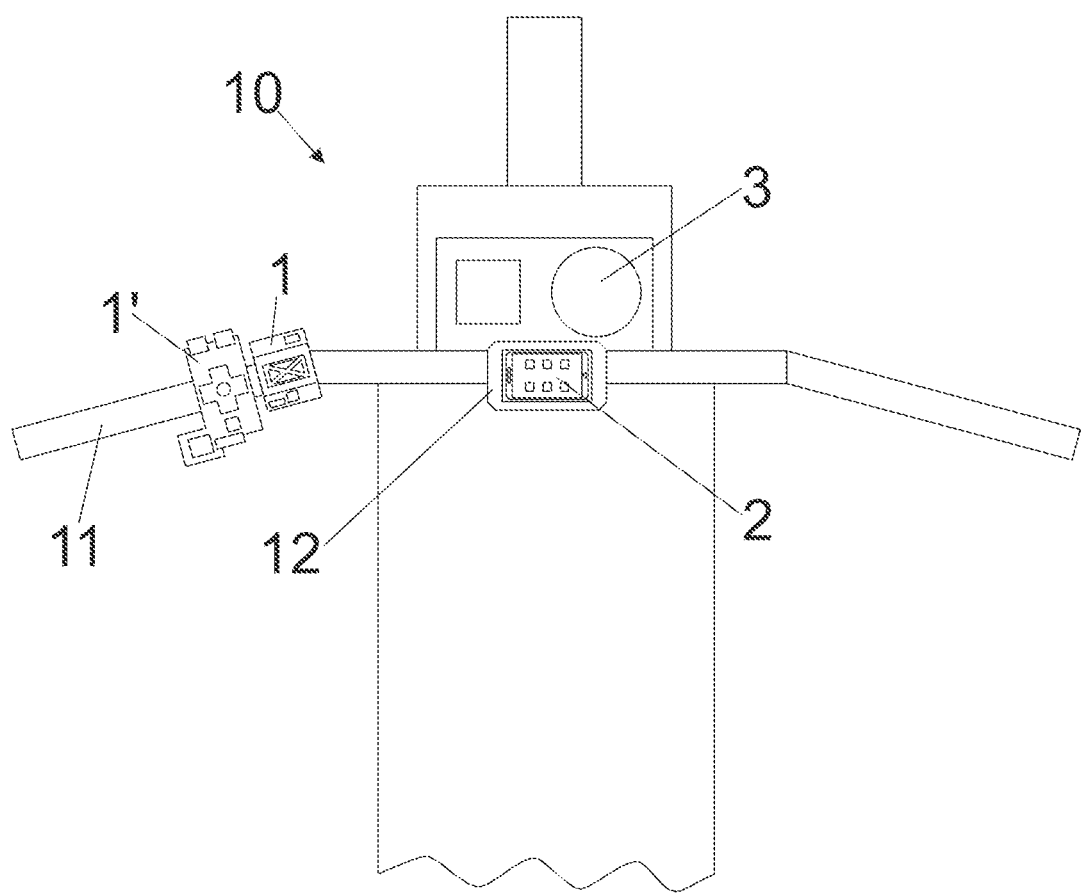
FIG. 1 is a representation of an operating unit with an additional operating unit according to the state of the art.

FIG. 1 illustrates a motorcycle 10 of the state of the art, where two operating units 1, 1' are attached to the handlebar 11, in a perspective, schematic representation. The display unit 3 includes the instruments, using which information on the driving state, such as, e.g., velocity, speed of the engine, outside temperature, temperature of the cooling fluid, daily kilometres, etc., can be represented. The display unit 3 is controlled via the operating unit 1, which for this purpose has actuating elements in the form of push switches. Further switches arranged on the operating unit 1 serve, e.g., for activating and deactivating of the direction indicators or actuating of a horn.

An additional operating unit 1' is arranged adjacent to the operating unit 1 and serves for controlling of a multifunctional device 2 in the form of a smartphone attached in a holder 12. This can be a subsequently attached holder. By operating the operating unit 1 as well as the additional operating unit 1', the rider of the motorcycle 10 is unduly distracted from the traffic situation, which represents a high safety risk.

Figure 2:
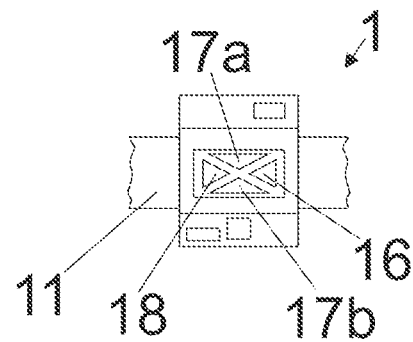
FIG. 2 illustrates an operating unit according to the invention.

FIG. 2 illustrates an operating unit 1 in the form of a grip switch assembled at the handlebar 11. The operating unit 1 comprises a four-way switch, which includes two arrow keys 17a, 17b. On the right-hand side of the four-way switch, a selection key is arranged, which also acts as the switching device 16. On the left-hand side, a backspace key 18 is arranged. Below the four-way switch, there are further push or setting switches, resp., which contrary to the four-way switch do not serve for controlling of the display unit 3, but, for example, for actuating the horn or for switching on the high beam.

If the operating unit 1 is in the first operating mode, in which the display unit 3 is controlled by actuating the actuating elements, a control command is generated by actuating the arrow key 17a, which effects returning to the previous menu item on the display unit 3. Actuating the arrow key 17b effects accessing of the next following menu item of the operating unit 1. The key 16a effects selecting of a respective menu item. Actuating the backspace key 18 effects selecting of the next higher menu level. Switching into second operating mode, in which actuating of the operating unit 1 generates control commands for (i.e., controls) the multifunctional device 2, is undertaken by pressing the selection key acting as the switching device 16 for more than 500 ms.

After actuating the switching device 16, control commands for an application are generated, by which the applications 7 installed on the multifunctional device 2 can be opened. On the one hand, the application serves to represent a reduced selection of applications 7 by pictograms on the screen 14 of the multifunctional device 2 and to provide them for selection. Using the arrow keys 17a, 17b, the application switches between the various applications 7, which can be opened. Actuation of the selection key, which upon long pressing serves as a switching device 16, opens a concretely selected application 7. Actuation of the backspace key 18 effects returning to the next higher menu level. Pressing the switching device 16 long again, the operating mode of the operating unit 1 is switched again, and control commands for controlling the display unit 3 are generated.

The keys of the four-way switch can have a second function allocated. For example, long continuous pressing, i.e., for more than 500 ms, of the key 17a, opens the application 7 with a navigation function. Long actuating of the arrow key 17b effects opening of the application 7 with a music function. Long actuating of the backspace key 18 effects returning to the main menu, where the applications 7 which can be opened are represented by pictograms again.

Based on the example of an application 7 with a music function, it is represented, how, using the operating unit 1, control commands for controlling the application 7 are generated and transmitted. Actuating the arrow key 17a effects selecting of the previous song, and actuating the arrow key 17b effects selecting of the next song in the selected playlist. Briefly actuating the selection key 16 effects stopping of the playback. Briefly actuating the key again effects continuing the playback. Actuating the backspace key 18 effects playing back of the selected song again from the start. This is one example of how the operating unit 1 can control the multifunctional device 2.

The keys of the four-way switch can also have a second function allocated for controlling the applications 7, which can be opened. Thus, for example, long pressing of the key 17a increases the volume of the song being played back. Longer actuating of the arrow key 17b effects reducing of the volume. Longer actuating of the backspace key 18 effects returning to the main menu. Longer actuating of the selection key 16, which also acts as a switching device 16, effects terminating of the operating mode of the operating unit 1, in which the multifunctional device 2 is controlled.

In this embodiment, the selection key 16 serves as a switching device. It would also be perceivable to provide a separate switch for the switching device 16 or to provide a select option in the display unit 3 in order to activate control of the multifunctional device 2.

Figure 3:
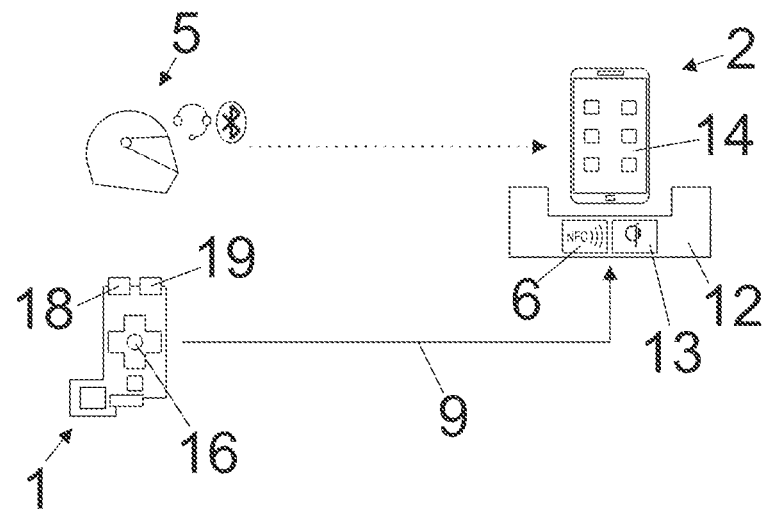
FIG. 3 is a schematic representation of an embodiment of the invention.

FIG. 3 illustrates an embodiment of the invention in a schematic representation, in which an operating unit 1 comprising a six-way switch can transmit control commands to a multifunctional device 2 designed as a smartphone via a bus line 9, for example a CAN bus line. The multifunctional device 2 is arranged in a holder 12. The bus line 9 can be connected with the multifunctional device 2 via a suitable plug. It is, however, also possible that the holder 12 includes a sending unit 6, from which the control commands can be wirelessly transmitted to the multifunctional device 2. In this embodiment, this is an NFC sending unit, which can be used as an alternative to a Bluetooth® module. The multifunctional device 2 includes a receiving device. Thereby, control commands generated by a headset 5, which are transmitted via Bluetooth®, can be received. Thus, the applications 7 on the multifunction device 2 can be controlled by voice commands.

The symbol represented next to the symbol for the NFC sending unit indicates that the holder 12 includes an inductive charging device 13.

In the embodiment represented here, the operating unit 1 is designed as a 6-way switch, which is connected with the holder 12, and thus with the sending unit 6, via a CAN bus 9. The 6-way switch includes a control crown having left and right keys as well as up and down keys. The push switch arranged in the center of the control crown acts as the switching device 16. The push switch arranged to the left above the control crown acts as the backspace key 18. Next to this switch, a setting switch 19 is arranged, which serves for adjusting of the cruise control function. A toggle switch is arranged in the rear upper area, which serves for switching on and off of the high beam. Below the control crown, a setting switch for the direction indicators is arranged. Below this setting switch, a push switch for the horn is arranged. On the left-hand side, two further push switches are arranged, which, for example, serve switching on and off of the cruise control function.

Figure 4A:
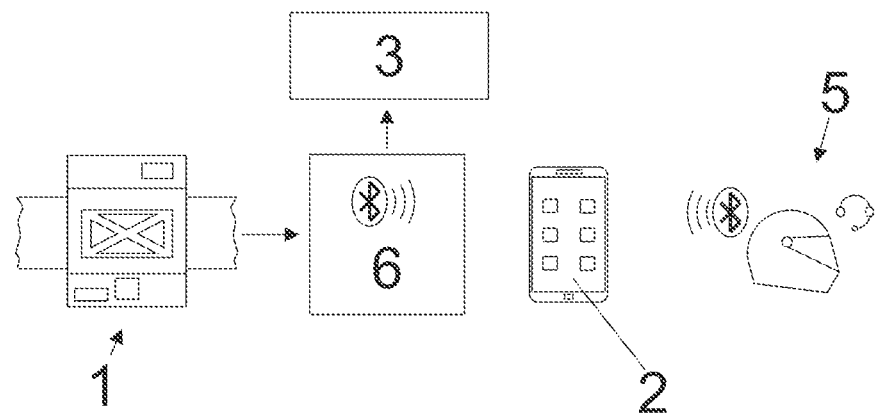
FIG. 4a, 4b are two schematic representations of further embodiments of the invention.

FIG. 4a illustrates a further embodiment of the invention in a schematic representation. In this embodiment, the operating unit 1 is connected with a sending unit 6 via a wireline 8. In turn, the sending unit 6 is connected with the display unit 3 via a wireline 8. The sending unit 6 includes a microcontroller and a Bluetooth® module, using which control commands generated by the operating unit 1 can be transmitted to a multifunctional device 2 via Bluetooth®.

The multifunctional device 2 is likewise coupled to a headset 5 via Bluetooth®. In that, the multifunctional device 2 includes a sending device, through which control commands as well as data can be transmitted to the headset 5. Simultaneously, the multifunctional device 2 also includes a receiving device, using which control commands from the headset 5 can be received for controlling the installed applications 7.

Figure 4B:
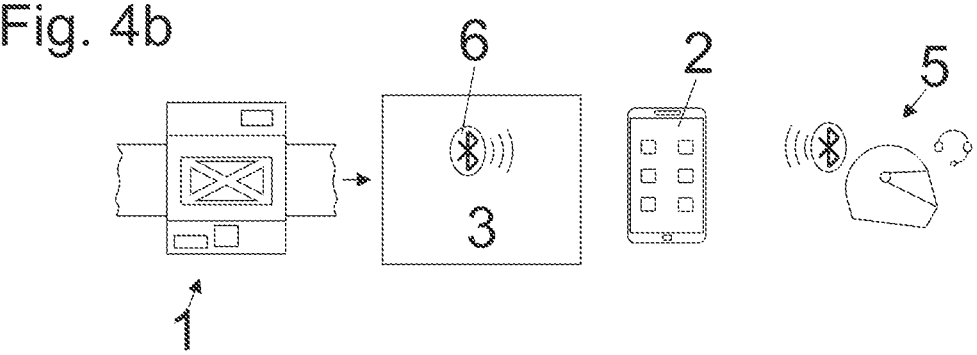

FIG. 4b illustrates a further embodiment of the invention in a schematic representation. This embodiment differs from the embodiment shown in FIG. 4a by the sending unit 6 being an integral component of the display unit 3.

The computer program product according to the invention, for switching the operating modes, is stored on a computer-readable storage medium in the motorcycle, e.g., in the control unit, the sending unit, the communications unit, the display unit, or directly in the operating unit.

Figure 5:
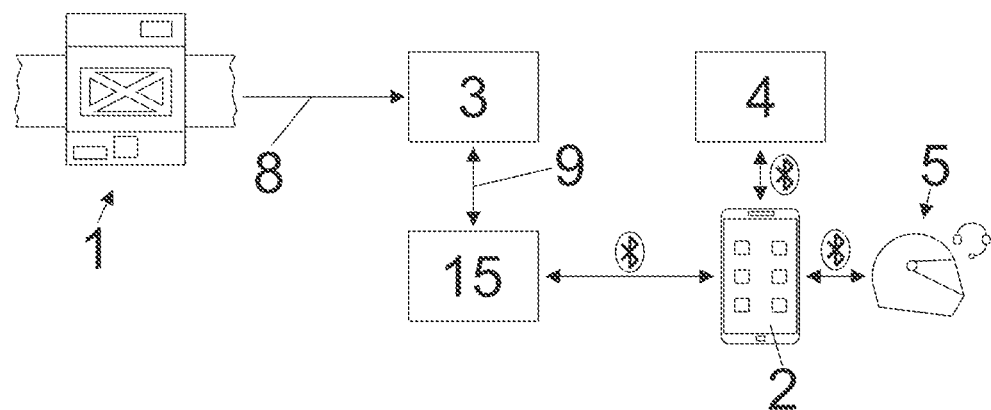
FIG. 5 is a schematic representation for a further embodiment of the invention.

FIG. 5 illustrates a further embodiment of the invention in a schematic representation. The operating unit 1 is again connected with the display unit 3 by a wireline 8. Via a bus line 9, for example, in the form of a CAN bus line, the display unit 3 is connected with a communications unit 15. The communications unit 15 serves for communicating with various components of the motorcycle 10. In particular, the communications unit 15 includes a sending unit 6, from which control commands can be wirelessly transmitted, preferably according to the Bluetooth® standard, to the multifunctional device 2. The multifunctional device 2 includes a sending device, through which data and/or control commands can be wirelessly transmitted, again preferably according to the Bluetooth® standard, to external devices 4, such as, e.g., a smartwatch or a camera or a headset 5. Furthermore, the sending device can also transmit data, for example songs, to the external devices 4, in particular to the headset 5.

Furthermore, the multifunctional device 2 includes a receiving device, which can receive data and/or control commands from the external devices 4 and/or from the headset 5.

Figure 6:
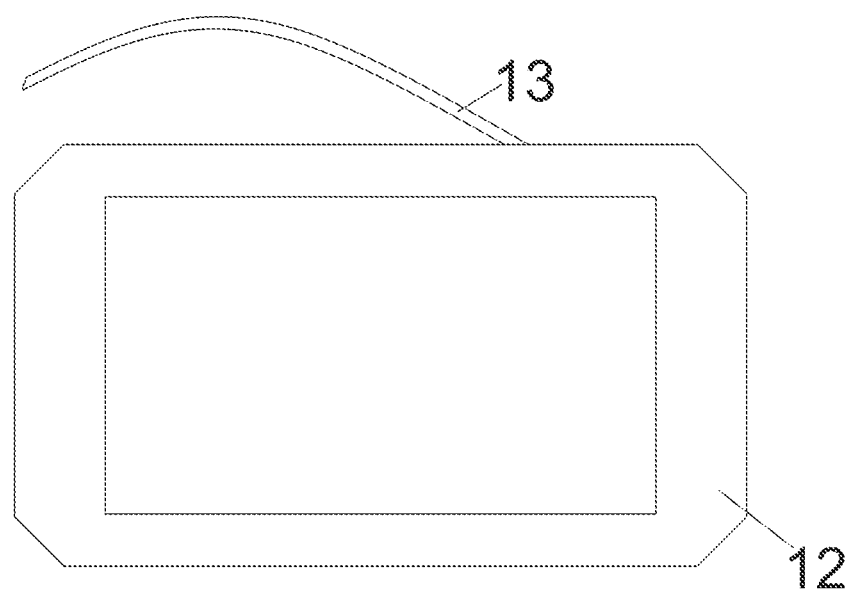
FIG. 6 is a schematic representation of a holder.

FIG. 6 illustrates the holder 12, which in this case is designed for receiving a smartphone. The holder 12 includes an inductive charging device 13, consisting of a charging cradle and a charging cable connected thereto, which is connected with the power supply of the motorcycle 10.

Figure 7:
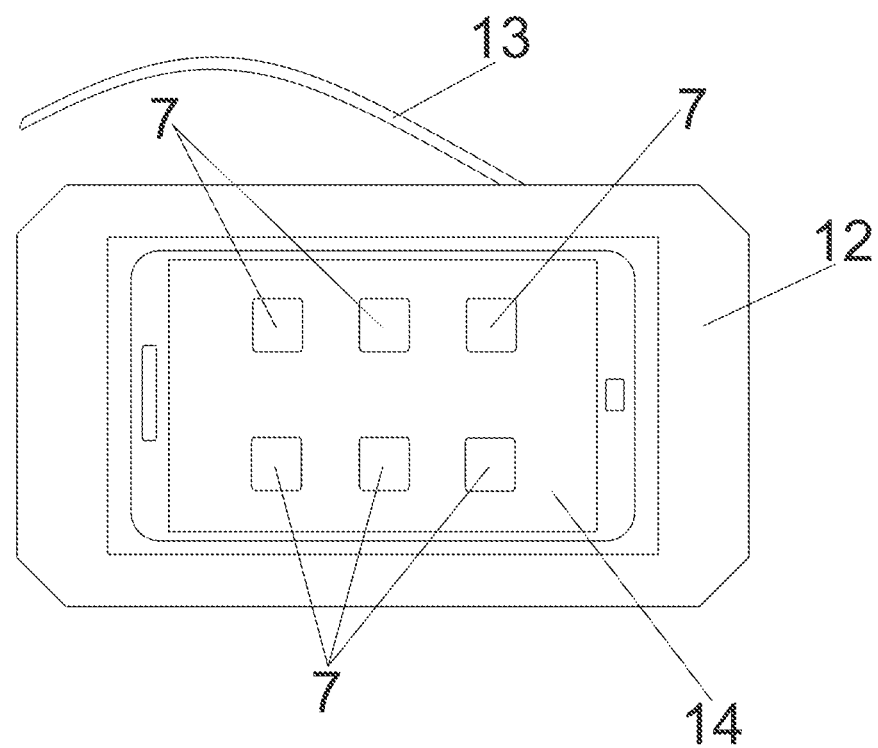
FIG. 7 is a schematic representation of a multifunctional device arranged in the holder.

FIG. 7 illustrates a representation of a multifunctional device 2 in the form of a smartphone arranged in a holder 12. Represented is the screen 14 with the pictograms for the further applications 7, which can be opened by the application according to the invention. As an example, some applications 7 shall be mentioned here, which can be operated via the operating unit 1 while riding.

An application 7, which can be opened, includes a navigation function. This can be, for example, the application Google® Maps, especially popular with drivers, because it is well-structured and easy to operate, and additionally offers excellent real-time traffic information. In that, it can be provided that not the entire functionality of this application is being offered, but a reduced functionality adapted to operation during the ride. The Google® Maps application furthermore offers a comprehensive interface, using which route guidance from another application, in particular from the application according to the invention (interface application), can be started. In addition, navigation targets can be searched, and locations in the vicinity, such as, e.g., petrol stations, offered.

A further application 7, which can be opened, which can be controlled by the operating unit 1, includes a music function. This can, for example, be a music player accessing songs stored on the multifunctional device 2. However, it can also be a streaming service provider.

A further application 7, which can be opened by the application according to the invention, includes a messaging function. It can be used to receive or send messages. This application 7 can be controlled via wirelessly received voice commands from a headset 5. In addition, messages received can be converted into audio by the multifunctional device 2 and transmitted to a headset 5.

A further application 7 includes a telephone function. Phone calls can be made, again, via a headset 5. In that, persons to be called can be selected from a contacts list via the headset 5 and/or via the operating unit 1.

A further application 7, which can be opened by the application according to the invention, includes a weather function. Selecting this application 7 provides a weather forecast, possibly issued as audio, wherein the application 7 can fall back on location data.

Furthermore, an application 7 can be opened and controlled, which activates an external camera, which, for example, is assembled at the helmet or at the motorcycle 10.

A further application 7, which can be opened and controlled, represents information on the driving state and/or on operating parameters of the motorcycle 10. Upon failure of this application 7, the screen 14 of the multifunctional device 2 serves as an additional screen besides the display unit 3.

LIST OF REFERENCE SIGNS

1 Operating unit
2 Multifunctional device
3 Display unit
4 External device
5 Headset
6 Sending unit
7 Applications, which can be opened
8 Wireline
9 Bus line
10 Motorcycle
11 Handlebar
12 Holder
13 Charging device
14 Screen
15 Communications unit
16 Switching device
17a, 17b Arrow keys
18 Backspace key
19 Setting switch

The invention claimed is:

1. A motorcycle comprising:
a display unit configured to display information relating to a driving state and relating to operating parameters of the motorcycle;
a holder;
a multifunctional device releasably attachable to the holder, the multifunctional device including a screen having a first pictogram representing a first application installed on the multifunctional device, the first application being configured to allow opening of additional applications installed on the multifunctional device and represented by respective additional pictograms on the screen;
an operating unit configured to generate control commands for controlling the display unit and for controlling the multifunctional device via the first application and the additional applications installed on the multifunctional device;
a control unit configured to transmit the control commands to the multifunctional device for controlling the multifunctional device via the first application and the additional applications installed on the multifunctional device; and
a switching device for switching an operation of the control unit between a control of the display unit and a control of the multifunctional device via the first application.

2. The motorcycle according to claim 1, wherein the operating unit comprises a grip switch at a handlebar.

3. The motorcycle according to claim 1, wherein the switching device comprises an actuating element of the operating unit.

4. The motorcycle according to claim 3, wherein the actuating element is a switch.

5. The motorcycle according to claim 1, further comprising a sending unit configured to wirelessly transmit the control commands for controlling the first application and the additional applications to the multifunctional device.

6. The motorcycle according to claim 5, wherein the sending unit is configured to transmit radio commands.

7. The motorcycle according to claim 6, wherein the sending unit is configured to transmit the radio commands according to the Bluetooth® standard.

8. The motorcycle according to claim 7, wherein at least one of the control unit and the sending unit is configured to wirelessly transmit the information relating to the driving state and relating to the operating parameters of the motorcycle to the multifunctional device.

9. The motorcycle according to claim 8, wherein the multifunctional device is configured to represent on the screen thereof the information relating to the driving state and relating to the operating parameters of the motorcycle.

10. The motorcycle according to claim 9, wherein at least one of the additional applications has a navigation function.

11. The motorcycle according to claim 1, wherein the multifunctional device is a smartphone.

12. The motorcycle according to claim 1, wherein the operating unit comprises at least one of (i) a plurality of arrow keys, and (ii) a multi-way switch.

13. The motorcycle according to claim 12, wherein the operating unit comprises one of a four-way switch, a five-way switch, and a six-way switch.

14. The motorcycle according to claim 1, wherein the multifunctional device includes a receiving device configured to receive the control commands for controlling the first application and the additional applications, the control commands being generated and transmitted by an external device.

15. The motorcycle according to claim 1, wherein at least one of the additional applications has a control function for controlling an external device.

16. The motorcycle according to claim 15, wherein the multifunctional device includes a sending device configured to wirelessly transmit control commands generated by the at least one of the additional applications having the control function to the external device.

17. The motorcycle according to claim 16, wherein the sending device is configured to transmit radio commands.

18. The motorcycle according to claim 17, wherein the sending device is configured to transmit the radio commands according to the Bluetooth® standard.

19. The motorcycle according to claim 1, wherein the holder includes a charging device configured to charge the multifunctional device.

20. A computer program product for operating the motorcycle according to claim 1, the computer program product comprising commands to cause a computer to:
- operate the operating unit of the motorcycle in two operating modes including a first operating mode wherein, upon actuation of the operating unit, the control commands for controlling the display unit to display information relating to a driving state and relating to operating parameters of the motorcycle are generated, and a second operating mode wherein, upon actuation of the operating unit, the control commands for controlling the first application installed on the multifunctional device and the additional applications installed on the multifunctional device are generated and transmitted to the multifunctional device, and
- monitor the switching device for actuation and, upon actuation of the switching device, switch the operating mode between the two operating modes.

21. A computer-readable data carrier storing the computer program product according to claim 20.

22. The computer-readable data carrier according to claim 21 mounted on the motorcycle.

23. A data carrier signal configured to transfer the computer program product according to claim 20.

24. The computer program product according to claim 20, further comprising commands to cause the computer to:
- upon execution by the multifunctional device, cause the multifunctional device to accept the control commands generated by the operating unit of the motorcycle and to open and control the first application and the additional applications installed on the multifunctional device.

25. A multifunctional device comprising a computer-readable data carrier storing the computer program product according to claim 24.

* * * * *